(12) United States Patent
Hardy et al.

(10) Patent No.: US 8,418,134 B2
(45) Date of Patent: Apr. 9, 2013

(54) METHOD FOR EFFICIENTLY MANAGING PROPERTY TYPES AND CONSTRAINTS IN A PROTOTYPE BASED DYNAMIC PROGRAMMING LANGUAGE

(75) Inventors: Vincent J. Hardy, Palo Alto, CA (US); Leo Ziegler, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 427 days.

(21) Appl. No.: 12/894,839

(22) Filed: Sep. 30, 2010

(65) Prior Publication Data

US 2012/0084750 A1 Apr. 5, 2012

(51) Int. Cl.
*G06F 9/44* (2006.01)
(52) U.S. Cl. .......................................... 717/115
(58) Field of Classification Search ................... 717/115
See application file for complete search history.

(56) References Cited

U.S. PATENT DOCUMENTS

| | | | | |
|---|---|---|---|---|
| 6,401,083 | B1 * | 6/2002 | Agarwal et al. | 1/1 |
| 6,735,759 | B1 * | 5/2004 | Yamamoto et al. | 717/136 |
| 2007/0168949 | A1 * | 7/2007 | Shattuck et al. | 717/115 |

* cited by examiner

*Primary Examiner* — Philip Wang
(74) *Attorney, Agent, or Firm* — Kilpatrick Townsend and Stockton LLP

(57) ABSTRACT

Methods and systems for managing property types, constraints, and other property validations in prototype-based dynamic programming languages, such as the JavaScript® programming language, are presented. A property definition is created for a target class by a programmer, and a properties class is automatically generated for the target class along with get and set methods to access and validate properties in the properties class. A properties class of a parent class can be automatically determined to exist and added such that the target class properties class inherits from the parent class properties class.

16 Claims, 8 Drawing Sheets

```
var propertiesDefinition = {                                    210
    x: {
        type: Number,
        constraints: [isFiniteNumber],
        defaultValue: 0,
        tag: GEOMETRY_UPDATE
    },
    ⋮
                                                                222
    fillColor: {
        type: Color,
        defaultValue: red,
        tag: RENDERING_PROPERTY_UPDATE
    },                                                          224
    fillOpacity: {
        type: Number,
        constraint: [isNumberInRange, [0,1]],
        defaultValue: 0,
        tag: RENDERING_PROPERTY_UPDATE
    }
}
```

FIG. 2

METHOD FOR EFFICIENTLY MANAGING PROPERTY TYPES AND CONSTRAINTS IN A PROTOTYPE BASED DYNAMIC PROGRAMMING LANGUAGE

CROSS-REFERENCES TO RELATED APPLICATIONS

NOT APPLICABLE

BACKGROUND

1. Field of the Art

The present disclosure relates generally to the field of data processing in prototype based dynamic languages. Specifically presented are methods and systems for declaring and using properties in automatically-added property classes in JavaScript® and other ECMAScript-compatible languages.

2. Description of the Related Art

Computer programming languages have developed rapidly over the years. Modern computer languages typically include provisions for declaring classes, from which objects are instantiated. This allows object-oriented approaches to programming. Object-oriented programming commonly allows encapsulation of code so that the code is modular and reusable for other programs as well as easier to abstract in regard to real-world things.

Modern computer languages that support object-oriented programming typically support inheritance between classes. A sub-class inherits methods (i.e., functions) and properties (i.e., attributes) from a parent class. For example, a rectangle class can inherit a LineThickness property from a parent shape class, the classes being used to draw graphical objects on a display.

Although many modern programming languages are designed to be compiled before they execute, other modern programming languages are interpreted on the fly during program execution. Some of the interpreted languages are "dynamic programming languages" in that their source code can be added to, objects and definitions can be extended, and/or their type systems can be modified during program execution (i.e., at runtime). The JavaScript® programming language is one example of a dynamic programming language. JavaScript is sometimes referred to as a dialect of ECMAScript.

ECMAScript is a computer programming scripting language complying with Ecma International's ECMA-262 specification and International Organization for Standardization (ISO)/International Electrotechnical Commission (IEC) 16262. ECMA was formerly known as the European Computer Manufacturers Association (ECMA). ECMAScript implementations include Netscape/Sun/Oracle JavaScript, Microsoft JScript, and Adobe ActionScript.

Dynamic programming languages commonly perform type checking at runtime. That is, the assignment of constants or variables to other variables, the passing of arguments to functions, etc. are checked to ensure that whatever is being assigned is compatible with the data type of the variable to which it is being assigned. For example, the number "3" is compatible to be stored in an integer variable, but it may not be compatible with a Boolean variable. If the number "3" were to be assigned to a Boolean variable in a strongly typed language, a type mismatch error can occur.

Some programming languages, such as JavaScript, attempt to convert the offending variable to the data type of the target variable. For example, the number "3" can be converted to a "true" (because it is non-zero) and then stored in the target Boolean variable. Although this automatic, behind-the-scenes conversion can prevent a type mismatch error, it can hide problems when programmers do not intend the mismatch. Thus, the benefits of having fewer runtime errors can weigh against the difficulties of debugging the code during development.

Along with relaxed type control, JavaScript does not prevent a programmer from overwriting a declared variable or object of one type with a variable or object of another type. For example, if a variable is declared as var x=5;

and then later on in the code the variable is re-declared as:

var x="cat";

there is no error. That is, there is no error in re-declaring the same variable later on in the code, even if the newly assigned value is of a completely different data type. JavaScript essentially ignores (and overwrites) the previous declaration. Although this prevents errors from popping up upon the re-declaration, it can be much more difficult for a programmer to debug code in which a variable or object is inadvertently re-declared. This can be especially troublesome for complex objects, such as graphical objects, in which dozens, hundreds, or thousands of properties must be tracked and managed.

There exists a need in the art for better techniques to program in widely supported, object-oriented, dynamic programming languages such as JavaScript.

BRIEF SUMMARY

Embodiments in accordance with the present disclosure relate to creating a 'properties class' that holds properties for each intended target class in a prototype based dynamic programming language such as the JavaScript® programming language. Each property of the target class is given its own get/set methods that enforce type-checking, etc. and themselves call methods in the properties class to actually store the values. The get/set methods can include provisions for updating the display, database, etc. only for properties that were actually changed and not rejected by the type checker, etc. Each property can be declared in code by a programmer and then added to the source code automatically by a code generator during runtime. Besides automatically inserting get/set methods, the runtime code generator can search the target class for parent(s). If a parent of the target class is found, then the target class's properties class is made to inherit from the parent's properties class. In prototype based dynamic programming languages, prototype objects can be used to share memory space for default values not only among objects of the target class but also among objects of the target class as those of its parents, grandparents, children, grandchildren, etc.

Some embodiments in accordance with the present disclosure relate to a method of managing properties in a prototype based dynamic programming language. The method includes declaring a property definition for an object property, creating a properties class from the property definition, adding the properties class to a target class, and automatically adding, during runtime, a get method and a set method for the property to the target class, the set method enabled to call a method in the properties class to change a variable storing the property.

The method can further include determining that the target class has a parent class, determining that the parent class has a properties class, and making the target class properties class inherit from the parent class properties class.

The method can also include declaring other property definitions for other properties, the other property definitions defining tags for their respective properties, adding, during runtime, other get methods and set methods for the respective properties to the target class, the set methods enabled to call methods in the properties class to change variables storing the other properties, calling an apply method with multiple property values to be set, returning the tag for each valid property value that was actually set, and based on the respective tag being returned, updating an object or database or sending a message to a user.

Yet other embodiments relate to systems and machine-readable tangible storage media which employ or store instructions for the methods described above.

A further understanding of the nature and the advantages of the embodiments disclosed and suggested herein may be realized by reference to the remaining portions of the specification and the attached drawings.

BRIEF DESCRIPTION OF THE DRAWINGS

FIG. 2 illustrates a properties definition in accordance with an embodiment.

The figures will be used below to illustrate different embodiments in accordance with the invention. The figures are specific examples of embodiments and should not be interpreted as limiting embodiments, but rather exemplary forms and procedures.

DETAILED DESCRIPTION

Generally described is a method and tool for creating a 'properties class' that holds properties for a target class in a prototype based dynamic programming language such as JavaScript. Each property of the target class is expressed by a programmer in code. In some embodiments, the code or settings from the user interface is run through a runtime code generator that automatically creates the properties class, adds the newly created properties class to the target class, and adds get and set methods to the target class at runtime. The set methods enforce type checking and range constraints at runtime and thereby prevents refreshing, updating, or other work unless a property value to be set was within the type and constraint limitations.

Figure 1A:
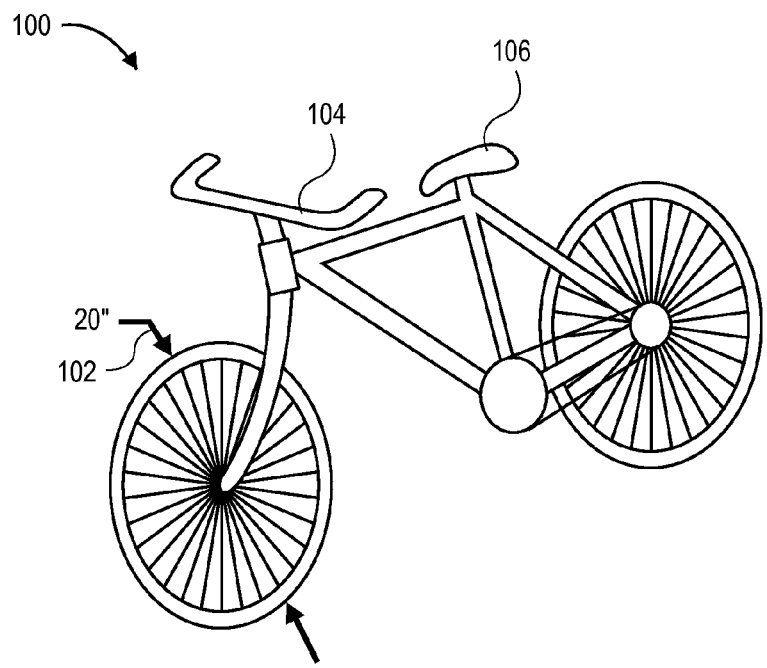
FIG. 1A illustrates a graphical shape that can be controlled by an embodiment.
Figure 1B:
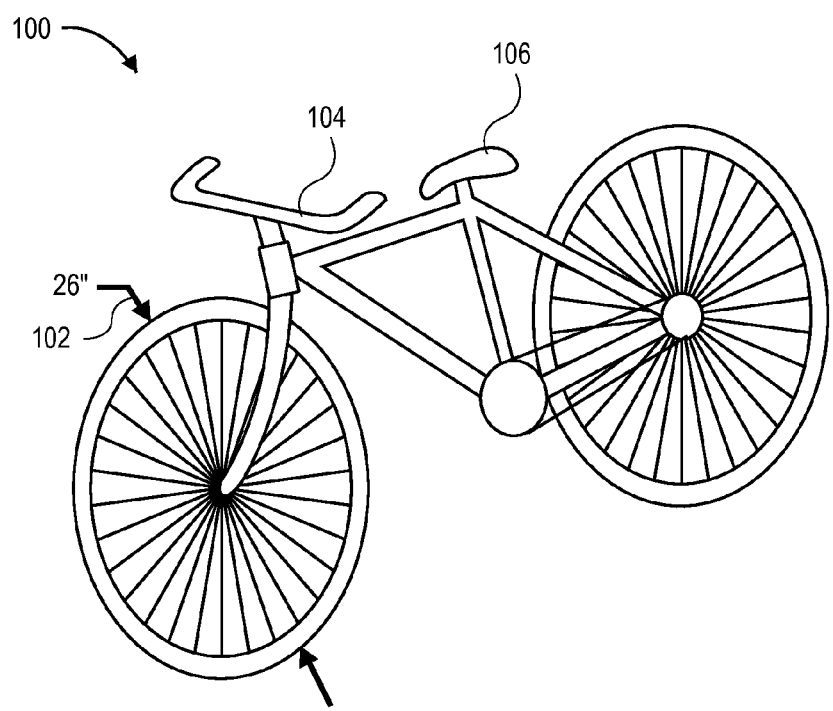
FIG. 1B illustrates the graphical shape of FIG. 1A with an altered property.

FIGS. 1A and 1B illustrate a graphics object that can be shown on a display. Graphics object 100 has the usual graphics properties such of color, linethickness, height/width, etc. Graphics object 100 also has custom properties attributable to the pictured bicycle, such as wheeldiameter 102, handlebartype 104, and seatcolor 106. Wheeldiameter property 102 is different between the figures for illustration purposes.

A designer of the bicycle class from which bicycle objects are instantiated may incorporate checks and controls in an embodiment to ensure that only certain wheeldiameters are allowed to be input into wheeldiameter property 102. For example, it would not make sense for a programmer to set wheeldiameter property 102 to the character 'a'. If some code inadvertently set wheeldiameter property 102 to 'a', then an error message could be sent to the programmer. An error message containing the line number of the script in which the type mismatch occurs may speed debugging of the code. As another example, it would not make sense for a programmer to set wheeldiameter property 102 to a negative value. If a negative number were received in a set method, validation code could take the absolute value of the entered value (thereby ignoring the negative value) or send an error message to the programmer.

A graphics object designer may wish to further restrict values that could be set as wheeldiameter property 102 for aesthetic, functional, or other reasons. For example, wheeldiameter property 102 could be constrained to one of three values that a physical bicycle may have: 20, 26, and 29. Each of these values corresponds to rim sizes in inches that are standardized among real bicycles. In an embodiment, a designer could have a pop up message alert a programmer or user to the rejection of any other than the three possible wheeldiameter sizes. In another embodiment, the bicycle shape object could silently reject the nonconforming value (i.e., any value other than 20, 26, and 29) and retain its default or previously set value.

The example above for wheeldiameter property 102 can be used for many properties. A single drawing object can have dozens, hundreds, or thousands of properties that can be altered. Each component of the drawing object can have its own properties that can be read or written through the object. The sheer number of properties can be difficult for a programmer to manage.

In an embodiment, a designer of graphics object 100 can define the data type, constraints, default values, and tags of its various properties through a user interface, code, or other property definition means. Once the data type, constraints, default values, and tags are expressed by the designer, an automatic runtime code generator can handle implementation details in the JavaScript code.

A "property definition" or "properties definition" includes code or settings for codifying data type, constraints, default values, and/or tags for a property or properties. A property definition can be in human-readable form and/or in unreadable form, such as binary data.

FIG. 2 illustrates a property/properties definition in accordance with an embodiment. Properties definition 200 includes multiple sections for defining various properties. Section 210 contains information for property 'x', which is the horizontal location of the relevant graphic object in relation to the left side of the drawing space of the hosting window. A designer can specify the data type of property 'x' in section 214. Here, the data type is a Number. Therefore, property 'x' can be any set to any number and not non-numbers. For example, property 'x' generally cannot be set to the character 'a'. A constraint, such as a range or set of ranges, can be specified for property 'x' in section 216. Here, the constraint limits property 'x' to any finite number. For example, property 'x' generally cannot be set to the global constant Infinity. The designer can specify a default value for property 'x' in section 218. Here, the default value is zero. Therefore, getting/reading the value of property 'x' will return zero unless the property has been set to another finite number. Section 220 includes a tag section in which a designer can specify any constant, enumeration, etc. that he or she wishes to be associated with property 'x'. The tag property can be used to associate the property with other properties. For example, property 'x' can share the same tag name as properties 'y' and 'z'. This can be useful when updating or refreshing. For example, a drawing object whose 'x', 'y', and 'z' properties have all been updated can prevent unnecessary redraws using tags; the tags allow a refresh or redraw to be triggered only once and not three times.

Section 222 contains information for property fillColor. In this example, no constraints are specified. Section 224 contains information for property fillOpacity. This property's constraints are any number between and including zero and one. Sections 222 and 224 both specify tag RENDERING_PROPERTY_UPDATE because they are related.

Properties definition 200 can be used by a runtime code generator to implement a properties definition class. The properties definition class can be associated with the target class at runtime in a prototype based dynamic programming language.

"Runtime" of computer code includes time and/or a mode in which the code is executed in a computer system. Runtime can include normal operation time as well as abnormal operation time, such as during an error handling situation. For example, the runtime of a snippet of JavaScript in a web page can include the time at which the script code is executed in a client browser before returning control to the user or awaiting input from the browser user.

Figure 3:
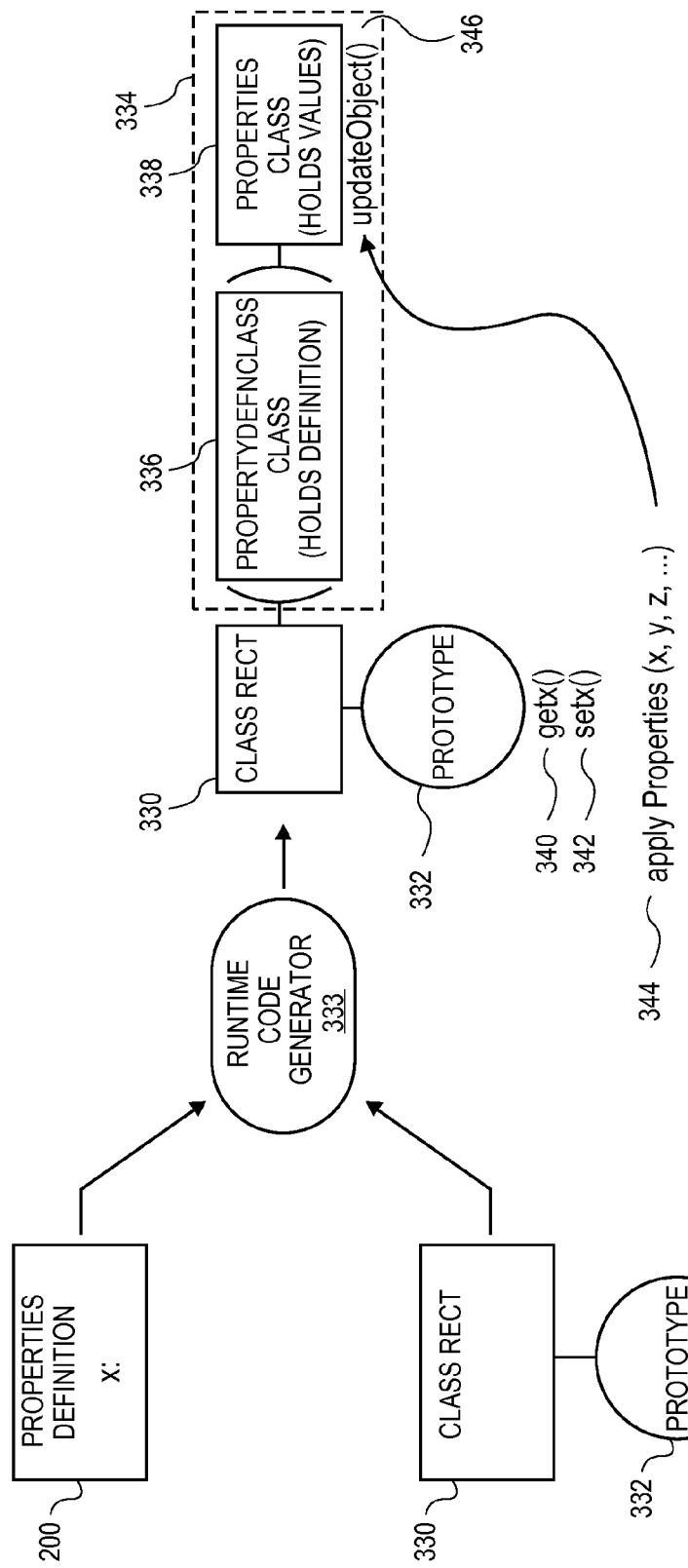
FIG. 3 illustrates inputs and outputs of a runtime code generator in accordance with an embodiment.

FIG. 3 illustrates inputs and outputs of a runtime code generator in accordance with an embodiment. After properties definition 200 is declared, it and target class 330 are fed into or read by runtime code generator 333. In the exemplary embodiment, target class 330 is class 'red', which is a rectangle graphical class. Target class 330 has prototype 332. A prototype (object) is a prebuilt object that simplifies the adding of custom properties/methods to all instances of an object of the class. Prototype objects were introduced to JavaScript in JavaScript version 1.1.

Runtime code generator 333 creates properties class 334, which optionally may be divided into properties definition class 336 and properties class 338. Properties definition class 336 holds the definitions of the properties, while properties class 338 stores the actual values of the properties. Properties definition class 334 (or 338) is automatically generated from properties definition 200, target class 330, and prototype 332. Properties class 334 includes a variable for storing property 'x' and methods for reading and writing the variable.

In addition to creating properties class 334, code generator 333 adds get and set methods to target class 330's prototype 332. Code generator 333 can act automatically, without human intervention after starting, to create the properties definition class and add get and set methods. "Automatic" code generation can include generation of code that is closely monitored by a computer programmer as well as code generation that is not viewed or monitored at all.

A "get method" includes a function under a class, or under an object instantiated from a class, that presents a readable setting, variable, or other attribute of the class or object. A get method does not have to present the attribute as read-only. A get method can return (a handle to) an object.

A "set method" or an "apply method" includes a function under a class, or under an object instantiated from a class, that writes a setting, variable, or other attribute of the class or object. A set or apply method can apply one or more properties. A set/apply method can return (a handle to) an object for setting the object.

Get and set methods, such as getx( ) method 340 and setx( ) method 342, are added by code generator 333. Calling getx( ) method 340 returns a number associated with the horizontal position of a rectangle on a display. Calling setx( ) method 342 with an argument sets the position of the rectangle on the display.

In the exemplary embodiment, setx( ) method 342 calls applyProperties( ) method 344. ApplyProperties( ) method 344 can be called with multiple arguments in order to set multiple properties at once. The applyProperties( ) method 344 calls updateObject( ) method 346 under properties class 338.

ApplyProperties( ) method 344 can attempt to set or apply each property in its arguments, and only those that are of the proper data type and within the specified constraints are actually changed. Tags flag which properties are set. For example, applyProperties( ) method 344 returns only tags for each property value that was of a valid type and within value constraints defined by property definition 200. Only for those properties that are changed are tags returned. Thus, a screen can be prevented from updating if none of the relevant properties were properly set. If the 'x' property was set with a legal range defined by the constraints, then its tag is returned and the display is updated.

The use of prototypes in JavaScript can greatly decrease memory needs for a program. The use of prototypes allows there to be default values shared by all object instances of a class without the default values being saved with each and every object in the class. Prototypes can be used to share methods in a class among all object instances of a class.

Figure 4A:
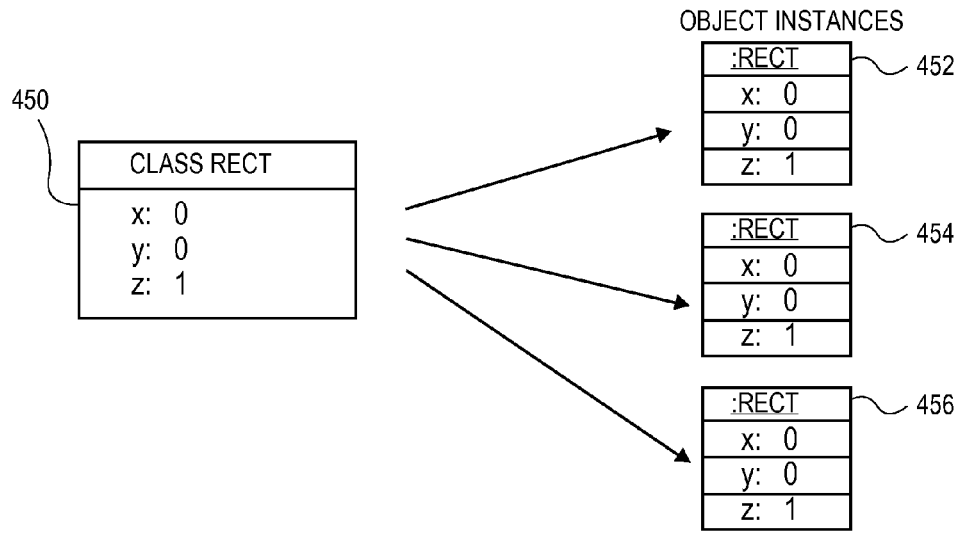
FIG. 4A illustrates memory allocation of the prior art.

FIG. 4A illustrates conventional memory allocation for objects with default values. From class 450, class rect, three default values are specified for x, y, and z. If three object instances of target class 450 are instantiated, such as object instances 452, 454, and 456, all three objects allocate memory for the default values.

Figure 4B:
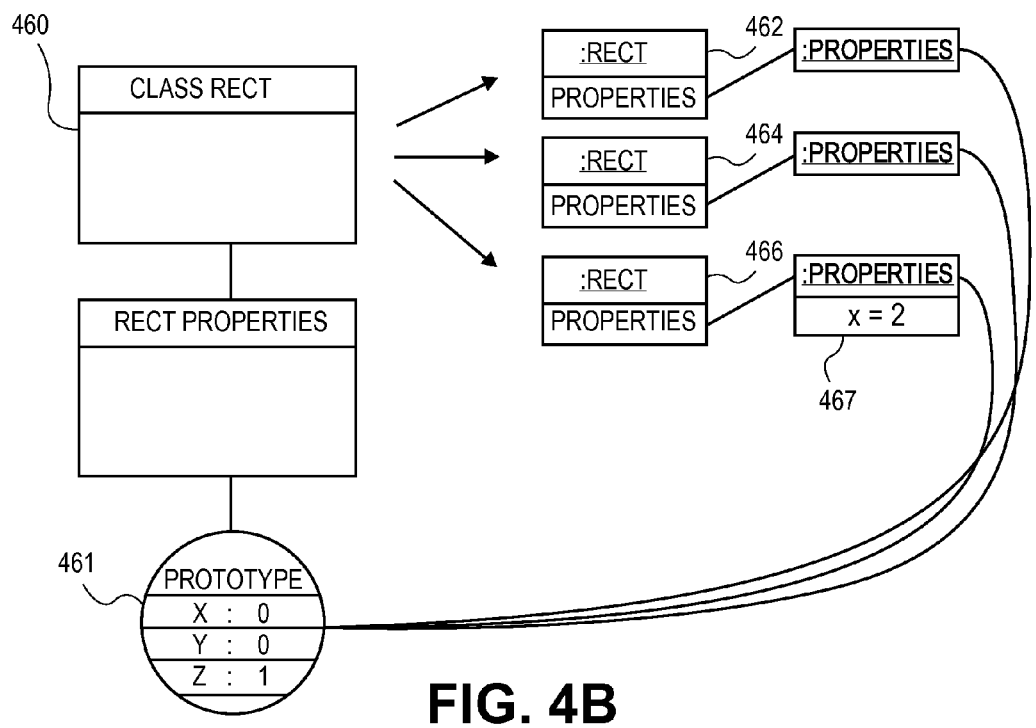
FIG. 4B illustrates memory allocation in accordance with an embodiment.

FIG. 4B illustrates memory allocation in accordance with an embodiment using a prototype. A prototype object is shared between all object instances of a class. Default values, specified in the class definition, are stored in the one prototype object. If three object instances of target class 460 are instantiated, such as object instances 462, 464, and 466, the objects do not separately allocate memory for the default values. If a programmer read-accesses (i.e., gets) a property that has not been set from the default value, then the object returns the default value from prototype 461. If one of the properties of an instantiated object is written to (i.e., set), then memory is dynamically allocated for that object only for the new value for the property. In the exemplary embodiment, memory is allocated for object 466 to store the value x=2 in extra memory 467. Thus, new memory is when a write operation requires it.

In situations where there are a large number of objects instantiated from the same class and the object has many properties, a situation common with graphical objects, using a prototype to store default values can greatly decrease memory utilization and speeding program execution.

Figure 5:
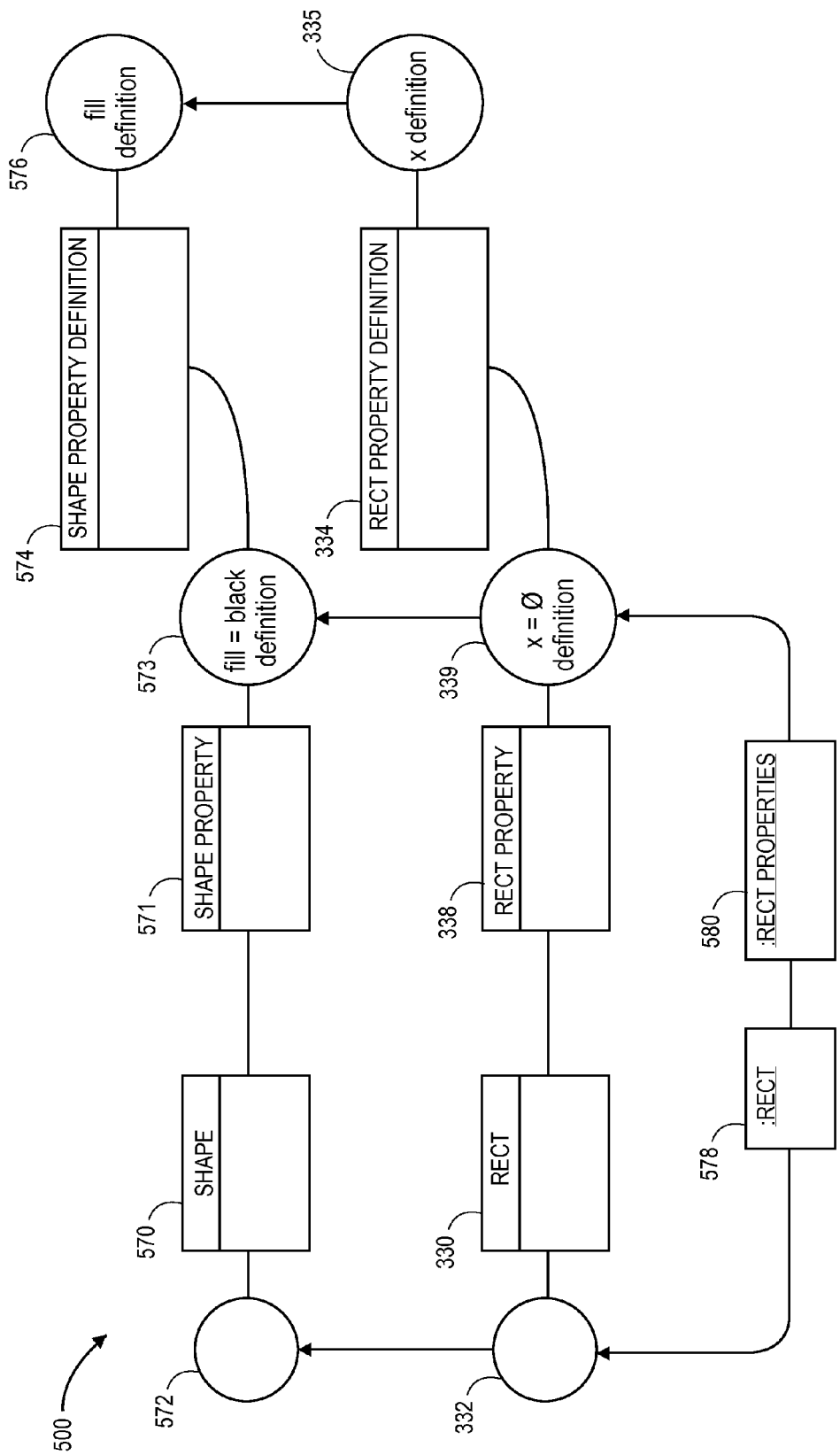
FIG. 5 illustrates a hierarchical class structure in accordance with an embodiment.

FIG. 5 illustrates a hierarchical class structure in accordance with an embodiment. Hierarchical class structure 500 includes parent class 570. Parent class 570 has prototype 572 and its own property defined in parent property class 571. Parent property class 571 has its own prototype, parent property class prototype 573, storing a default value of 'black' for a fill property. Parent property class 571 has a property definition, parent class property definition class 574. Property definition class 574 has its own prototype 576.

Target class 330 has prototype 332 and its own property defined in target property class 338. Target property class 338 has its own prototype, target property prototype 339, which stores a default value of x=0. Target property prototype 339 has a property definition, target class property definition 334. Target class property definition 334 has prototype 335.

When an object 578 of target class 330 is instantiated, a corresponding object of target class property definition 580 is instantiated as well in order to hold the definitions and values of the properties of the object 578. If a get method for property 'x' is read, then a zero is returned from prototype 339 (unless the 'x' property has been changed). If a get method for property fill is read, then 'black' is returned from prototype 573. As shown, not only are methods and properties of the object inherited from parent class 570, but the property class methods and properties are essentially inherited as well.

During execution of code generator 333 (FIG. 3), the inheritances as described above can all be created automatically. Upon receiving or reading target class 330 as an input, the code generator can determine whether target class 330 has a parent class. If it does, then the code generator can determine whether the parent class has a property class. If it does, which is the case in FIG. 5, then the code generator can make target class property definition class 334 inherit from parent class property definition class 574.

Figure 6:
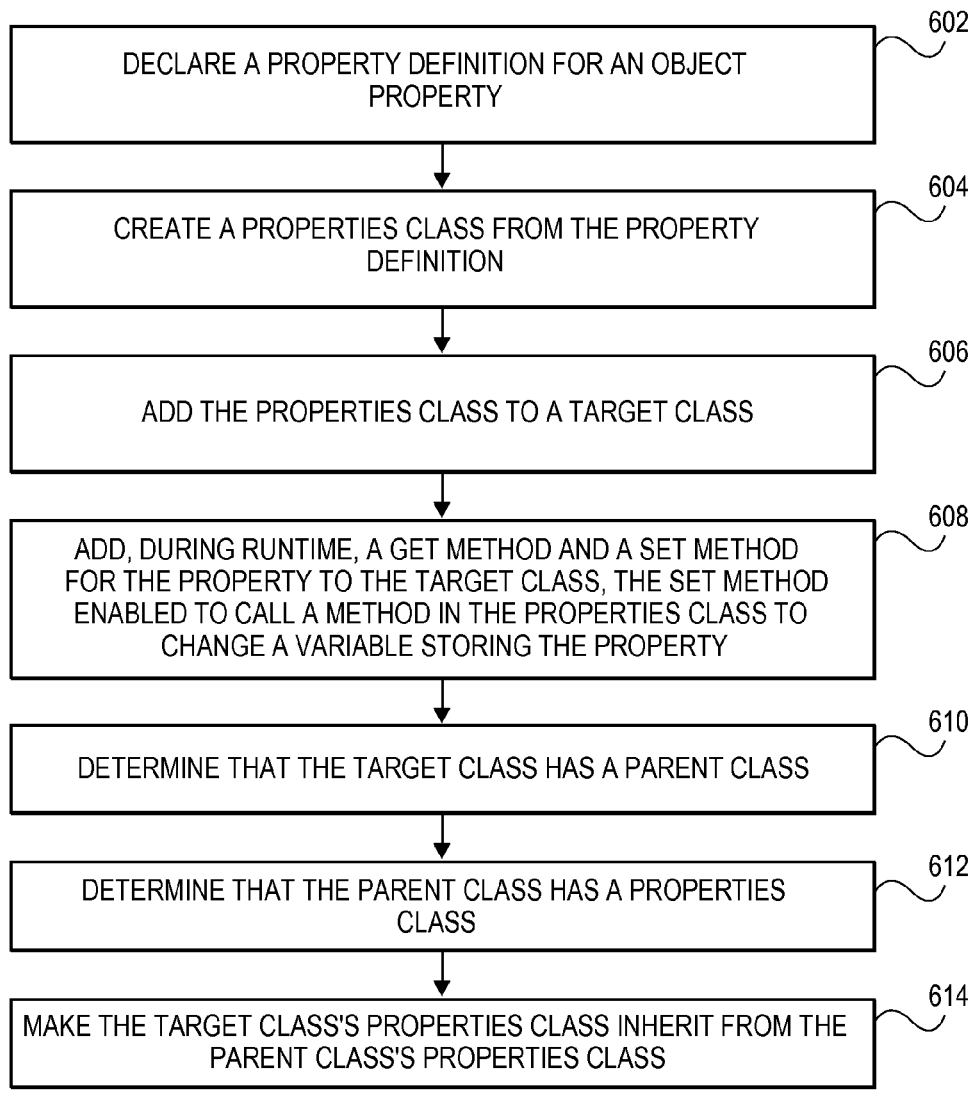
FIG. 6 is a flowchart illustrating an embodiment in accordance with the present invention.

Making a class inherit from another class can include the use of an extend function. For example, under the Yahoo User Interface (YUI) library making class B inherit from class A can be accomplished by the function:
 YUI.lang.extend(classB, classA);
As another example, under the jQuery JavaScript library, the same can be accomplished by the function:
 JQuery.extend(classB, classA);

FIG. 6 shows an example flowchart illustrating a process in accordance with one embodiment. This process can be automated in a computer or other machine. The process can be coded in software, firmware, or hard coded as machine-readable instructions and run through a processor that can implement the instructions. In operation 602, a property definition for an object property is declared. In operation 604, a properties class is created from the property definition. In operation 606, the properties class is added to a target class. In operation 608, a get method and a set method for the property are added, during runtime, to the target class. The set method is enabled to call a method in the properties class to change a variable storing the property. Note that one generally cannot add methods to classes during runtime in non-dynamic programming languages.

In operation 610, it is determined that the target class has a parent class. Because of this determination, flow proceeds to operation 612. In operation 612, it is determined that the parent class has a properties class. Because of this determination, flow proceeds to operation 614. In operation 614, based on the prior two determinations, the target class's properties class is made to inherit from the parent class's properties class. These operations may be performed in the sequence given above or in different orders as applicable.

Figure 7:
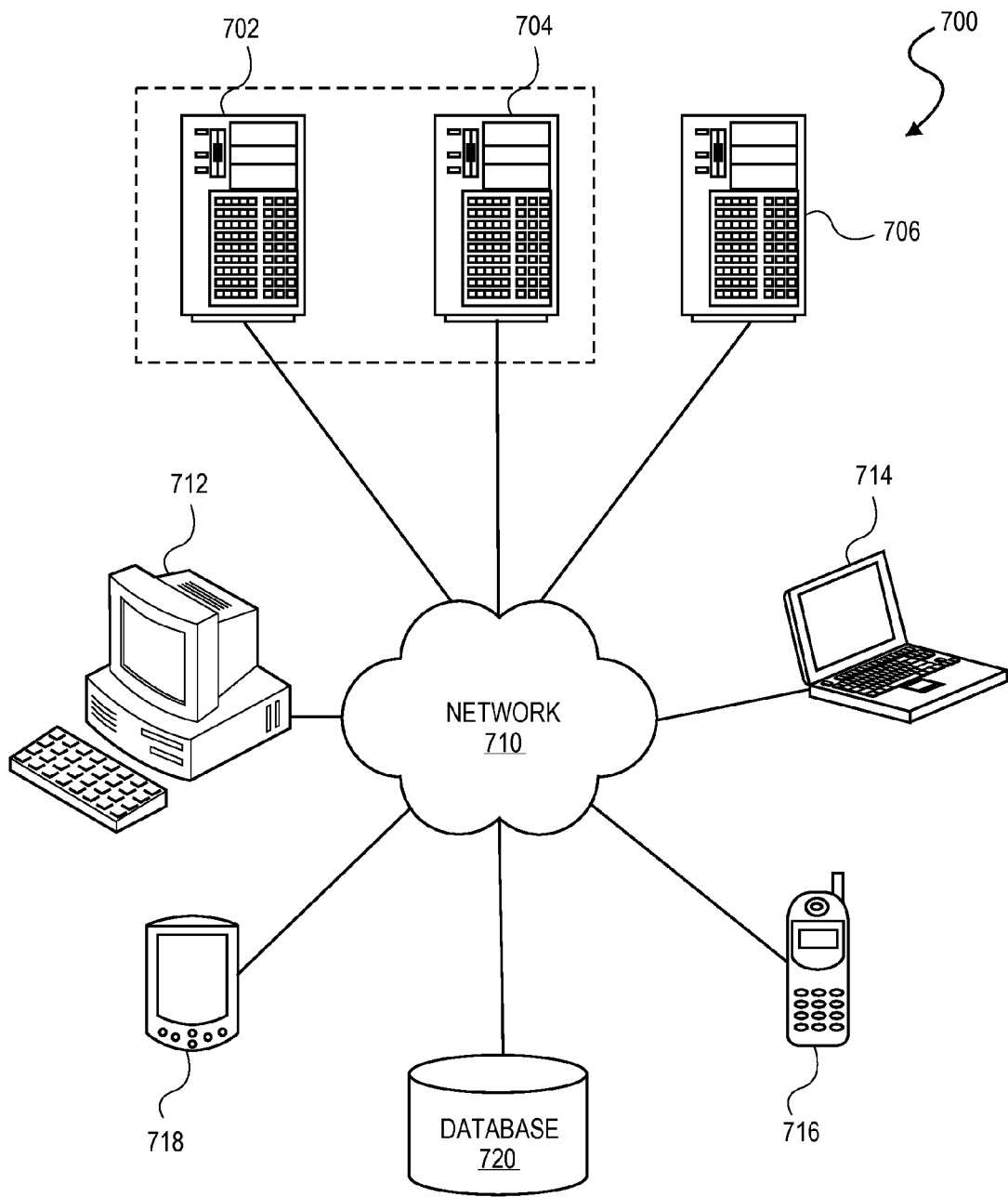
FIG. 7 illustrates components of a computer network that can be used in accordance with one embodiment.

FIG. 7 is a block diagram illustrating components of an exemplary operating environment in which various embodiments of the present invention may be implemented. The system 700 can include one or more user computers, computing devices, or processing devices 712, 714, 716, 718, which can be used to operate a client, such as a dedicated application, web browser, etc. The user computers 712, 714, 716, 718 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 712, 714, 716, 718 may also have any of a variety of applications, including one or more development systems, database client and/or server applications, and Web browser applications. Alternatively, the user computers 712, 714, 716, 718 may be any other electronic device, such as a thin-client computer, Internet-enabled gaming system, and/or personal messaging device, capable of communicating via a network (e.g., the network 710 described below) and/or displaying and navigating Web pages or other types of electronic documents. Although the exemplary system 700 is shown with four user computers, any number of user computers may be supported.

In most embodiments, the system 700 includes some type of network 710. The network may can be any type of network familiar to those skilled in the art that can support data communications using any of a variety of commercially-available protocols, including without limitation TCP/IP, SNA, IPX, AppleTalk, and the like. Merely by way of example, the network 710 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.5G, 3G, 4G, Wimax, WiFi, CDMA 2000, WCDMA, the Bluetooth protocol known in the art, and/or any other wireless protocol); and/or any combination of these and/or other networks.

The system may also include one or more server computers 702, 704, 706 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 706) may be dedicated to running applications, such as a business application, a Web server, application server, etc. Such servers may be used to process requests from user computers 712, 714, 716, 718. The applications can also include any number of applications for controlling access to resources of the servers 702, 704, 706.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 712, 714, 716, 718. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 712, 714, 716, 718.

The system 700 may also include one or more databases 720. The database(s) 720 may reside in a variety of locations. By way of example, a database 720 may reside on a storage medium local to (and/or resident in) one or more of the computers 702, 704, 706, 712, 714, 716, 718. Alternatively, it may be remote from any or all of the computers 702, 704, 706, 712, 714, 716, 718, and/or in communication (e.g., via the network 710) with one or more of these. In a particular set of embodiments, the database 720 may reside in a storage-area network ("SAN") familiar to those skilled in the art. Similarly, any necessary files for performing the functions attributed to the computers 702, 704, 706, 712, 714, 716, 718 may be stored locally on the respective computer and/or remotely, as appropriate. In one set of embodiments, the database 720 may be a relational database, such as Oracle 10g, that is adapted to store, update, and retrieve data in response to SQL-formatted commands.

Figure 8:
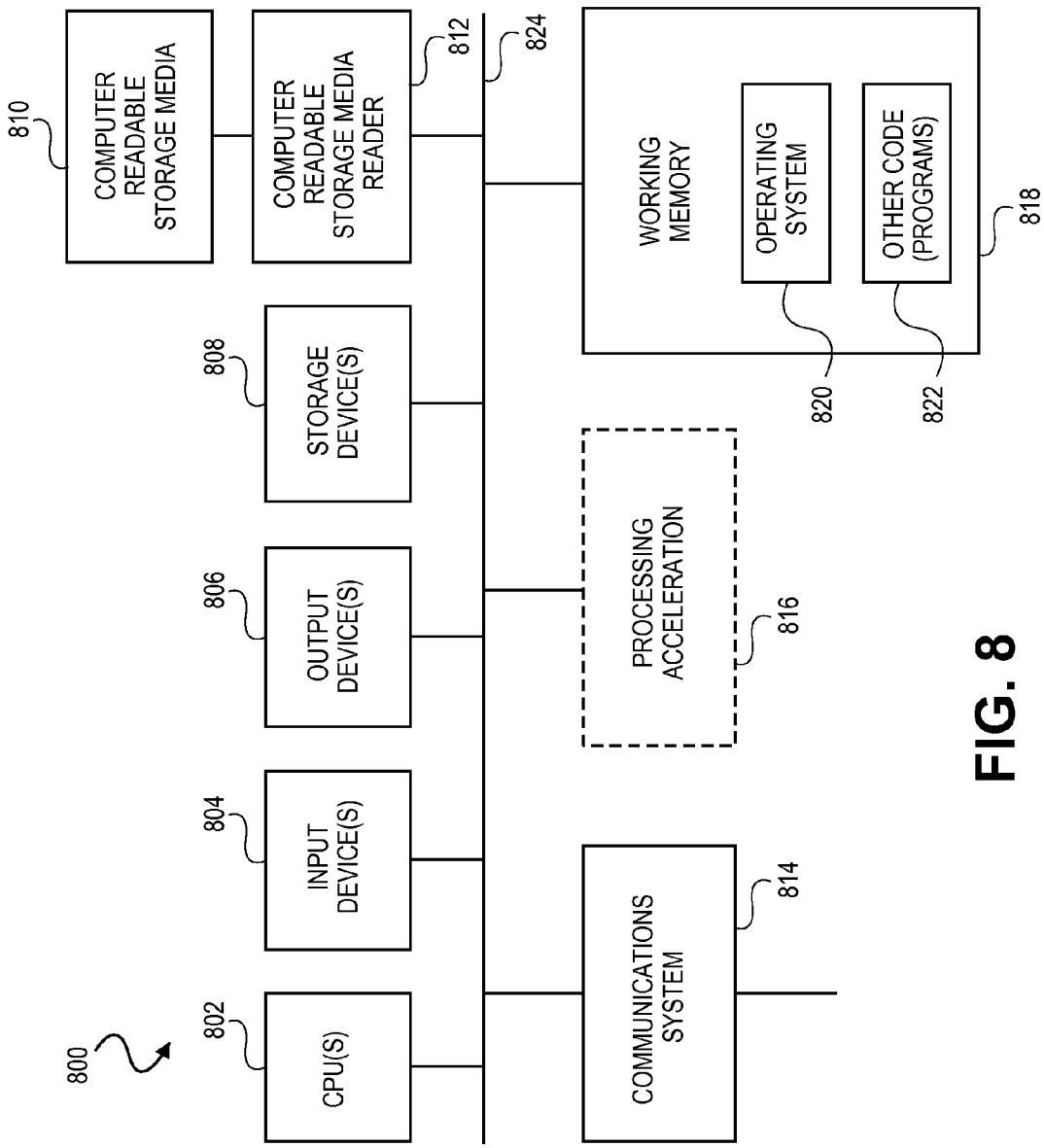
FIG. 8 illustrates components of a computerized device that can be used in accordance with one embodiment.

FIG. 8 illustrates an exemplary computer system 800, in which various embodiments of the present invention may be implemented. The system 800 may be used to implement any of the computer systems described above. The computer system 800 is shown comprising hardware elements that may be electrically coupled via a bus 824. The hardware elements may include one or more central processing units (CPUs) 802, one or more input devices 804 (e.g., a mouse, a keyboard, etc.), and one or more output devices 806 (e.g., a display device, a printer, etc.). The computer system 800 may also include one or more storage devices 808. By way of example, the storage device(s) 808 can include devices such as disk drives, optical storage devices, solid-state storage device such as a random access memory ("RAM") and/or a read-only memory ("ROM"), which can be programmable, flash-updateable and/or the like.

The computer system 800 may additionally include a computer-readable storage media reader 812, a communications system 814 (e.g., a modem, a network card (wireless or wired), an infra-red communication device, etc.), and working memory 818, which may include RAM and ROM devices as described above. In some embodiments, the computer system 800 may also include a processing acceleration unit 816, which can include a digital signal processor DSP, a special-purpose processor, and/or the like.

The computer-readable storage media reader 812 can further be connected to a tangible computer-readable storage medium 810, together (and, optionally, in combination with storage device(s) 808) comprehensively representing remote, local, fixed, and/or removable storage devices plus storage media for temporarily and/or more permanently containing, storing, transmitting, and retrieving computer-readable information. The communications system 814 may permit data to be exchanged with the network and/or any other computer described above with respect to the system 800.

The computer system 800 may also comprise software elements, shown as being currently located within a working memory 818, including an operating system 820 and/or other code 822, such as an application program (which may be a client application, Web browser, mid-tier application, RDBMS, etc.). It should be appreciated that alternate embodiments of a computer system 800 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

What is claimed is:

1. A method of managing properties in a prototype based dynamic programming language, the method comprising:
   declaring a property definition for an object property;
   creating a properties class from the property definition;
   adding, using a processor operatively coupled to a memory, the properties class to a target class; and
   adding, during runtime, a get method and a set method for the property to the target class, the set method enabled to call a method in the properties class to change a variable storing the property, the set method enabled to validate the property against the property definition.

2. The method of claim 1 further comprising:
   determining that the target class has a parent class;
   determining that the parent class has a properties class; and
   making the target class properties class inherit from the parent class properties class.

3. The method of claim 1 wherein the property definition defines a tag for the property, the method further comprising:
   declaring other property definitions for other properties, the other property definitions defining tags for their respective properties;
   adding, during runtime, other get methods and set methods for the respective properties to the target class, the set methods enabled to call methods in the properties class to change variables storing the other properties;
   calling an apply method with multiple property values to be set;
   returning the tag for each property value that is of a valid type and within value constraints defined by the property definition;
   based on the respective tag being returned, updating an object or database or sending a message to a user.

4. The method of claim 1 further comprising:
   declaring an instance of the target class, thereby creating an instance of the properties class;
   calling the set method with multiple property values to be set;
   returning a tag for each property value that is of a valid type and within value constraints defined by the property definition; and updating, based on the returned tag, a graphical object, database, or message to a user.

5. The method of claim 1 wherein the property definition defines a data type for the property, thereby allowing the property to have only values of a type specified by the data type.

6. The method of claim 1 wherein the property definition defines a constraint for the property, thereby constraining the property to have values within a specified range or specified ranges.

7. The method of claim 6 further comprising:
attempting to set the property to a value outside a constraint defined in the property definition; and
generating an error at runtime based on the value being outside the constraint.

8. The method of claim 1 wherein the property definition defines a default value for the property.

9. The method of claim 1 wherein the target class defines a graphical shape.

10. The method of claim 1 wherein the prototype based dynamic programming language includes ECMAScript.

11. The method of claim 10 wherein the ECMAScript is a programming language selected from the group consisting of JavaScript, JScript, and ActionScript.

12. The method of claim 1 wherein the operations are performed in the order shown.

13. The method of claim 1 wherein each operation is performed by the processor operatively coupled to the memory.

14. A computer system executing instructions in a computer program, the computer program instructions comprising program code for performing the operations of claim 1.

15. A machine-readable non-transitory storable medium embodying information indicative of instructions for causing one or more machines to perform operations comprising:
declaring a property definition for an object property;
creating a properties class from the property definition;
adding the properties class to a target class; and
adding, during runtime, a get method and a set method for the property to the target class, the set method enabled to call a method in the properties class to change a variable storing the property, the set method enabled to validate the property against the property definition.

16. A computer system for managing properties in a prototype based dynamic programming language, the computer system comprising:
at least one processor;
a memory operatively coupled to the at least one processor, the processor enabled to execute program code including:
program code for declaring a property definition for an object property;
program code for creating a properties class from the property definition;
program code for adding the properties class to a target class; and
program code for adding, during runtime, a get method and a set method for the property to the target class, the set method enabled to call a method in the properties class to change a variable storing the property, the set method enabled to validate the property against the property definition.

* * * * *